US011737004B2

(12) United States Patent
Chen et al.

(10) Patent No.: US 11,737,004 B2
(45) Date of Patent: Aug. 22, 2023

(54) PREDICTIVE WI-FI DATA OFFLOADING SYSTEMS AND METHODS

(71) Applicant: GM GLOBAL TECHNOLOGY OPERATIONS LLC, Detroit, MI (US)

(72) Inventors: Jinzhu Chen, Troy, MI (US); Lakshmi V. Thanayankizil, Troy, MI (US); Shu Chen, Rochester Hills, MI (US); Chuan Li, Warren, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 68 days.

(21) Appl. No.: 17/332,806

(22) Filed: May 27, 2021

(65) Prior Publication Data

US 2022/0394586 A1 Dec. 8, 2022

(51) Int. Cl.
*H04W 4/00* (2018.01)
*H04W 36/32* (2009.01)
*H04W 48/16* (2009.01)
*H04W 48/20* (2009.01)
*H04W 84/12* (2009.01)

(52) U.S. Cl.
CPC ........... *H04W 36/32* (2013.01); *H04W 48/16* (2013.01); *H04W 48/20* (2013.01); *H04W 84/12* (2013.01)

(58) Field of Classification Search
CPC ...... H04W 36/32; H04W 48/16; H04W 48/20
USPC ......................................................... 370/331
See application file for complete search history.

(56) References Cited

U.S. PATENT DOCUMENTS

2020/0379079 A1* 12/2020 Dupray ................ H04W 64/00

* cited by examiner

*Primary Examiner* — Temica M Beamer
(74) *Attorney, Agent, or Firm* — Lorenz & Kopf LLP

(57) ABSTRACT

Systems and method are provided for transmitting data from a vehicle using a Wi-Fi network. A method includes: collecting, by a processor, performance data associated with a plurality of access points in the Wi-Fi network; segmenting, by a processor, a route into a plurality of route segments; mapping, by a processor, the plurality of access points to the plurality of route segments; selecting, by a processor, a set of access points from the plurality of access points based on the collected performance data, wherein the set of access points comprises a selected access point for each route segment of the plurality of route segments; predicting, by a processor, a scanning channel based on the set of access points and a current location of the vehicle; and selectively transmitting, by a processor, packet data based on the set of access points, the scanning channel, and the associated performance data.

18 Claims, 4 Drawing Sheets

PREDICTIVE WI-FI DATA OFFLOADING SYSTEMS AND METHODS

INTRODUCTION

The present disclosure generally relates to Wi-Fi data of vehicles, and more particularly relates to systems and methods for predictive Wi-Fi data offloading.

Some vehicles use Wi-Fi communication systems to communicate vehicle information to and from a remote transportation system or back office or to communicate information to and from personal devices within the vehicle. The vehicle Wi-Fi communication systems communicates with one or more access points along the route of the vehicle. For example, a vehicle typically scans for available access points on different channels until one is found.

Such unplanned Wi-Fi access strategy leads to less efficient vehicle data uploading to the back office. In addition, such scanning process leads to less efficient data uploading and in-vehicle Wi-Fi application performance.

Accordingly, it is desirable to provide methods and systems for providing predictive Wi-Fi data offloading between access points. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for communicating vehicle data. In one embodiment, a system includes: collecting, by a processor, performance data associated with a plurality of access points in the Wi-Fi network; segmenting, by a processor, a route into a plurality of route segments; mapping, by a processor, the plurality of access points to the plurality of route segments; selecting, by a processor, a set of access points from the plurality of access points based on the collected performance data, wherein the set of access points comprises a selected access point for each route segment of the plurality of route segments; predicting, by a processor, a scanning channel based on the set of access points and a current location of the vehicle; and selectively transmitting, by a processor, packet data based on the set of access points, the scanning channel, and the associated performance data.

In various embodiments, the performance data is collected from vehicles connected to the plurality of access points.

In various embodiments, the performance data is collected from the plurality of access points.

In various embodiments, the performance data comprises one or more of throughput, signal strength, a Wi-Fi channel, latency, capacity, and a price for each access point of the plurality of access points.

In various embodiments, the mapping the access points is based on geo-hashing.

In various embodiments, the mapping the access points is based on matching to a map of the vehicle or of a remote transportation system.

In various embodiments, the selecting the set of access points is based on a computed score computed from the performance data.

In various embodiments, the computed score is based on a cost to switch to the access point.

In various embodiments, the selecting the set of access points is based on a weighted graph.

In various embodiments, the selecting the set of access points is based on reinforcement learning.

In various embodiments, the predicting the scanning channel is based on a distance the current location of the vehicle is away from the access point.

In various embodiments, the method further includes determining a packet number based on the performance data, an encounter duration, and a bandwidth, wherein the selectively transmitting the packet data is based on the packet number, a priority and a deadline.

In another embodiment, a system includes: a first non-transitory computer module configured to, by a processor, collect performance data associated with a plurality of access points in the Wi-Fi network; a second non-transitory computer module configured to, by a processor, segment a route into a plurality of route segments, and map the plurality of access points to the plurality of route segments; a third non-transitory computer module configured to, by a processor, select a set of access points from the plurality of access points based on the collected performance data, wherein the set of access points comprises a selected access point for each route segment of the plurality of route segments; a fourth non-transitory computer module configured to, by a processor, predict a scanning channel based on the set of access points and a current location of the vehicle; and a fifth non-transitory computer module configured to, by a processor, selectively transmit packet data based on the set of access points, the scanning channel, and the associated performance data.

In various embodiments, the performance data is collected from vehicles connected to the plurality of access points.

In various embodiments, the performance data is collected from the plurality of access points.

In various embodiments, the performance data includes one or more of throughput, signal strength, a Wi-Fi channel, latency, capacity, and a price for each access.

In various embodiments, the second non-transitory computer module is configured to map the access points based on at least one of geo-hashing and matching to a map of the vehicle or of a remote transportation system.

In various embodiments, the third non-transitory computer module is configured to select the set of access points based on a computed score computed from the performance data, wherein the computed score is based on a cost to switch to the access point.

In various embodiments, the third non-transitory computer module is configured to select the set of access points based on at least one of a weighted graph and reinforcement learning.

In various embodiments, the fifth non-transitory computer module is configured to determine a packet number based on the performance data, an encounter duration, and a bandwidth, and selectively transmit the packet data based on the packet number, a priority and a deadline.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
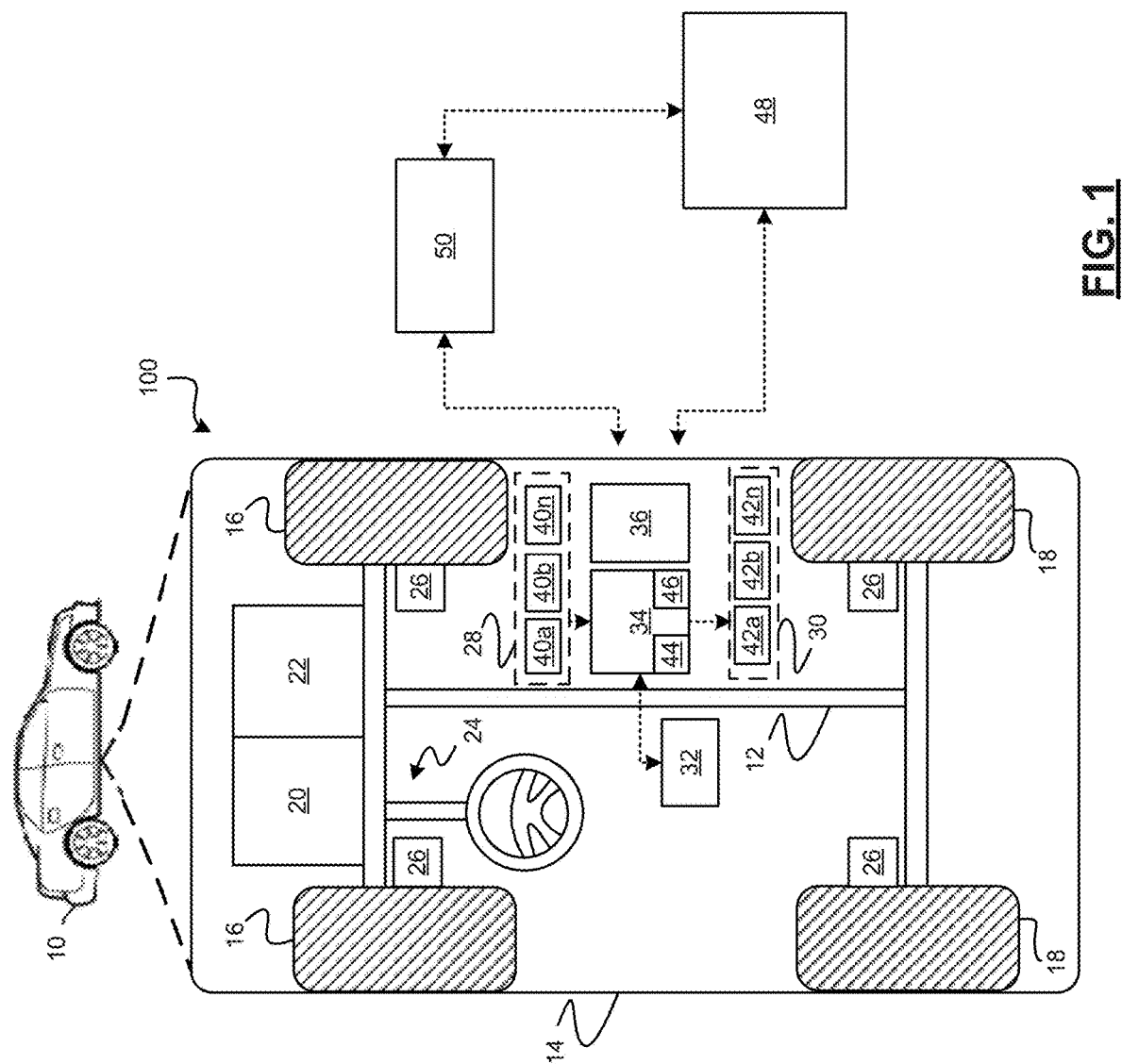
FIG. 1 is a functional block diagram illustrating a vehicle having a communication system, in accordance with various embodiments.

With reference to FIG. 1, a communication system shown generally at 100 is associated with a vehicle 10 in accordance with various embodiments. As will be discussed in more detail below, the communication system 100 plans, for a given route, vehicle data offloading and a channel switching strategy based on crowd sourced channel, availability, and performance information of Wi-Fi access points, as well as real-time traffic information. The vehicle data offloading and channel switching strategy are planned to optimize data uploading cost and performance.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle and the sensor system 100 is incorporated into the autonomous or semi-autonomous vehicle 10. In an exemplary embodiment, the vehicle 10 is autonomous in that it provides partial or full automated assistance to a driver operating the vehicle 10. The vehicle 10 is depicted in the illustrated embodiment as a passenger car, but it should be appreciated that any other vehicle including electric bicycles, motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication module 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, inertial measurement units, and/or other sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote transportation system 48 and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate by communication messages over any suitable communication medium or a combination of communication mediums and that cooperate to process the sensor signals, perform logic, calculations, methods, and/or algorithms, and generate control signals to automatically control features of the vehicle 10.

The communication module 36 is configured to wirelessly communicate information, using Wi-Fi or other protocol (e.g., C-V2X, WiGig, etc.), to and from other entities such as, but not limited to, other vehicles 47, the remote transportation system 48, and/or one or more access points 50 configured to communicate with the remote transportation system and/or the other vehicles. In various embodiments, the communication system 100 may be embodied in one or more instructions of the controller 34. The one or more instructions generate instructions for the communication module 36 to selectively communicate with the other vehicles 47, the remote transportation system 48, and/or the access points 50. The instructions, when executed by the processor 44, plan vehicle data offloading and channel switching using crowd sourced information of the access points 50 and real-time traffic information.

Figure 2:
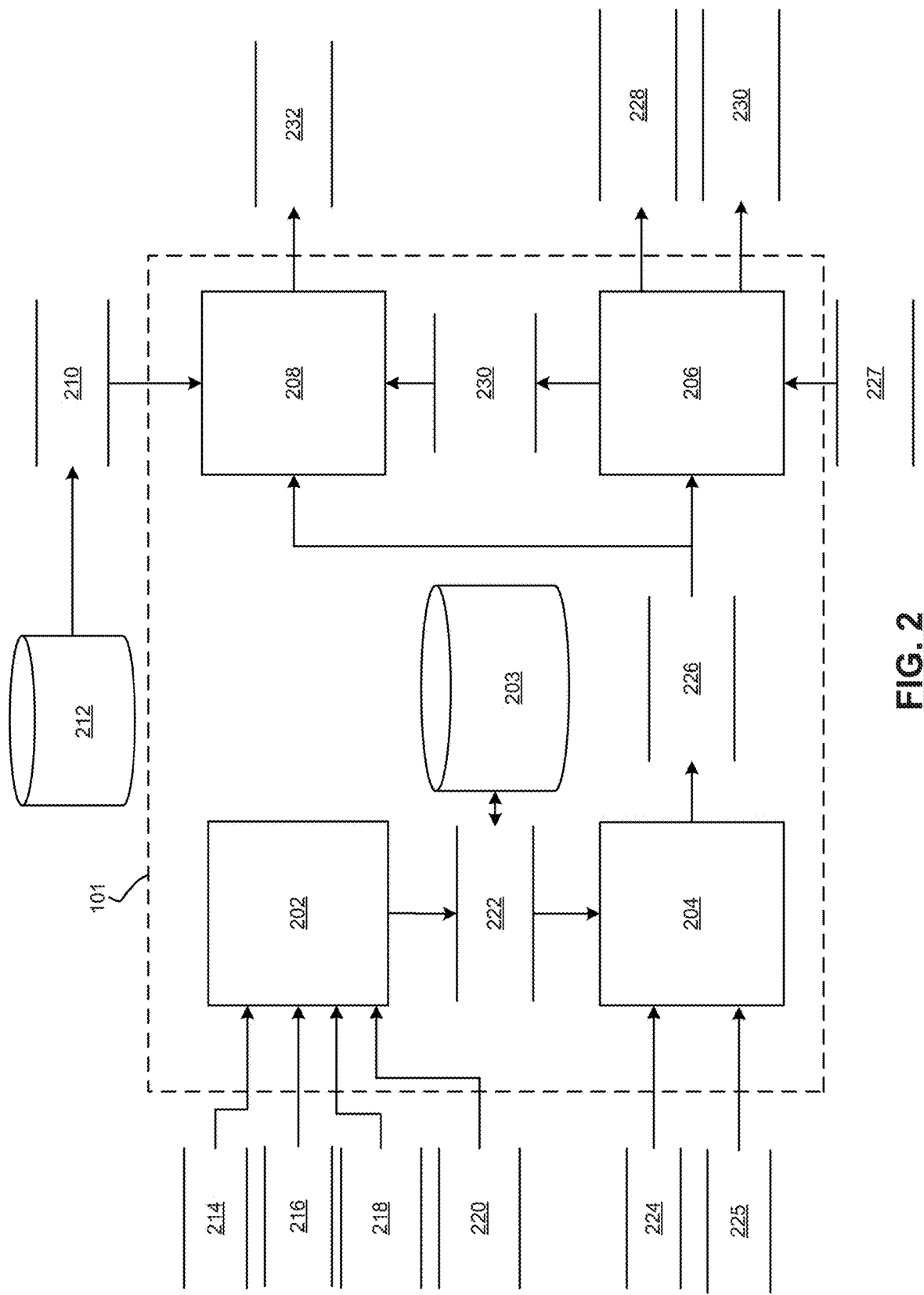
FIG. 2 is a dataflow diagram illustrating a communication module of the communication system, in accordance with various embodiments.

Referring now to FIG. 2, and with continued reference to FIG. 1, a dataflow diagram illustrates various embodiments of a communication module 101 that is a part of the communication system 100 as a part of the controller 34. Various embodiments of the communication module 101 according to the present disclosure may include any number of sub-modules. As can be appreciated, the sub-modules shown in FIG. 2 may be combined and/or further partitioned to similarly plan vehicle data offloading and channel switching. Inputs to the communication module 101 may be received from the remote transportation system 48, the access points, the sensing devices 40a-40n, received from other control modules (not shown) of the vehicle 10, and/or determined by other sub-modules (not shown) of the control module 34. In various embodiments, the communication module 101 includes a Wi-Fi data collection module 202, an access point data datastore 203, an access point selection module 204, a channel switching module 206, and a packet transmission module 208. The modules work collectively to efficiently upload file data 210 from a file datastore 212 to, for example, the remote transportation system 48 for further processing through various access points 50 along a route. In various embodiments, the files of the file data 210 each include upload requirement parameters, such as, priority parameters, and deadline parameters.

In various embodiments, the Wi-Fi data collection module 202 receives as input route data 214 indicating the upcoming route, cost data 216 received from the various access points 50, performance data 218 measured directly by the vehicle 10 (actively or passively), and performance data 220 received from the other vehicles 47 and/or from the remote transportation system 48. In various embodiments, the cost data 216 indicates a cost of use (e.g., two tier, single price, etc.) if the access point 50 supports dynamic pricing. In various embodiments, the performance data 218 measured by the vehicle 10 indicates performance of access points 50 and can include measured throughput, signal strength, jitter, uptime, Wi-Fi channel information, packet loss, latency, and switching time (e.g., from one access point to another). Performance metrics may be based on a specific historical time window data (e.g., last minute, last 15 minutes, last week). Access point selection may also consider the number of active connections in conjunction with performance metrics and adjust the selection accordingly. In various embodiments, the performance data 220 received from the other vehicles 47 and/or the remote transportation system 48 includes data indicating traffic capacity, that is, an indication of how many vehicles can be around the particular access point without compromising bandwidth.

The Wi-Fi data collection module 202 collects the received data and associates the received data with the various access points 50. The Wi-Fi data collection module 202 then segments the route and associates the collected data to the route segments based on location of the access points relative to the route segments. The Wi-Fi data collection module then stores the associated data as access point data 222 in the access point data datastore 212.

In various embodiments, the Wi-Fi data collection module 202 segments the route using, for example, map matching or geo-hashing. The Wi-Fi data collection module 202 then assigns each point to a route segment based on a location of the access point relative to the route segment.

In various embodiments, the access point data 222 can be combined from multiple sources and/or be combined with historical data and saved as shown in Table 1, as an example:

TABLE 1

| ID | Loc | RSSI(t) | Pkt loss | Ch | Latency | Thpt | Cost | switch | Traffic |
|---|---|---|---|---|---|---|---|---|---|
| AP 1 | (lat, lon) | Fluctuate | 1% | 6 | 200 ms | Fluctuate | Two tier | 2 sec | 1000 Cars/hr |
| AP 2 | (lat, lon) | constant | 4% | 9 | 500 ms | constant | Single price | 4 sec | 100 Cars/hr |

In various embodiments, the Wi-Fi data collection module 202 combines historical data with new data using a filter such as, but not limited to, a low pass filter:

$$y_n = k \cdot y_{n-1} + (1-k)x_n,$$

where the $y_{n-1}$ is the historical data and $x_n$ is the new data.

In various embodiments, the access point selection module 204 receives the access point data 222, route data 224, and traffic data 225. Based on the receive data 222-225, the access point selection module 204 selects a set of access points to connect to along the route indicated by the route data 224 and generates set of access point data 226 based thereon. For example, the access point selection module 204 computes scores from the access point data 222 and the traffic data 225. The scores are associated with switching from one access point of a particular route segment to another access point of another route segment. The access point selection module 204 then selects an access point to connect to while traveling the route segment based on the computed scores.

For example, assuming in the jth segment, with a length of L and estimated travel speed of v, the i^th access point of the segment is $i_j$, the following random variables are defined from the access point data 222 and the traffic data 225: A_1, A_2, ..., A_n represent n access points, B_1, B_2, ..., B_n represent the throughput, R_1, R_2, ..., R_n represent the signal strength, L_1, L_2, ..., L_n represent the latency, C_1, C_2, ..., C_n represent access point capacity N_1, N_2, ..., N_n represent number of connected vehicles, O_1, O_2, ..., O_n represent the Wi-Fi price, W_1, W_2, ..., W_n represent the switching time into this access point, and α_i represent the weights of the parameters. The access point selection module 204 computes the segment score $s_j$ by:

$$s_j = \alpha_1 \cdot \frac{L}{v} \cdot B_{i_j} + \alpha_2 \cdot R_{i_j} + \alpha_3 \cdot \frac{c_{i_j}}{N_{i_j}} + \alpha_4 \cdot \frac{1}{L_{i_j}} + \alpha_5 \cdot \frac{1}{O_{i_j}}.$$

The access point selection module 204 computes the switching cost $w_j$ by:

$$w_j = \alpha_5 \cdot \min(1, i_j - i_{j-1}) \cdot W_{i_j} \cap B_{i_{j-1}}.$$

The access point selection module 204 then finds a solution that maximizes the score $s_j$ and minimizes the switching cost $w_j$, ij=0 or 1 where:

$$i: \min \sum_J \left( \frac{\lambda_1}{s_j} + \lambda_2 w_j \right).$$

Figure 3:
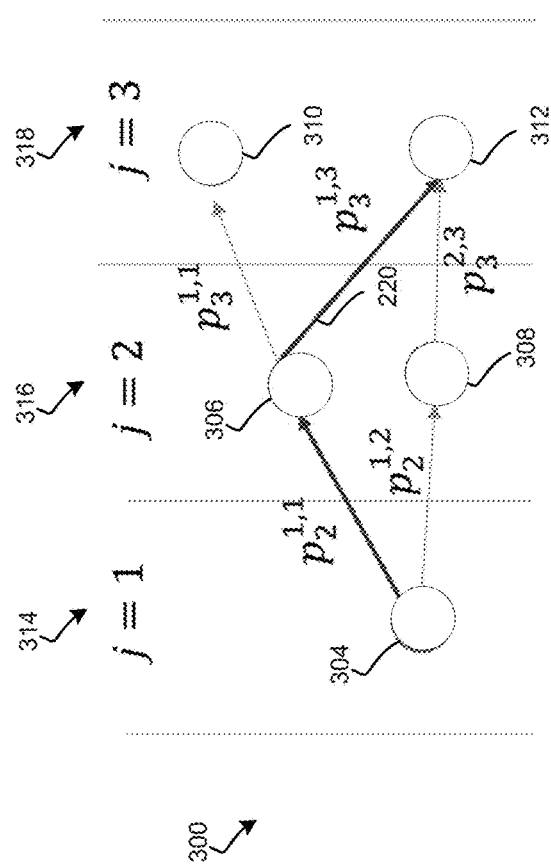
FIGS. 3 and 4 are illustrations of methods for selecting access points and performed by the communication module, in accordance with various embodiments.

For example, as shown in FIG. 3, a weighted graph 300 can be constructed of access points 302-312 for the road segments j 314-318. A cost of switching from $m^{th}$ access point at the $(j-1)^{th}$ road segment to $n^{th}$ access point at the $j^{th}$ road segment is represented as $p_j^{m,n}$ which can be calculated with corresponding $s_j$ and $w_j$:

$$p_j^{m,n} = \frac{\lambda_1}{s_j} + \lambda_2 w_j.$$

A shortest path 320 of the weighted graph is found by dynamic programing (i.e., Dijkstra's algorithm., etc.) and the access points are selected from the shortest path.

Figure 4:
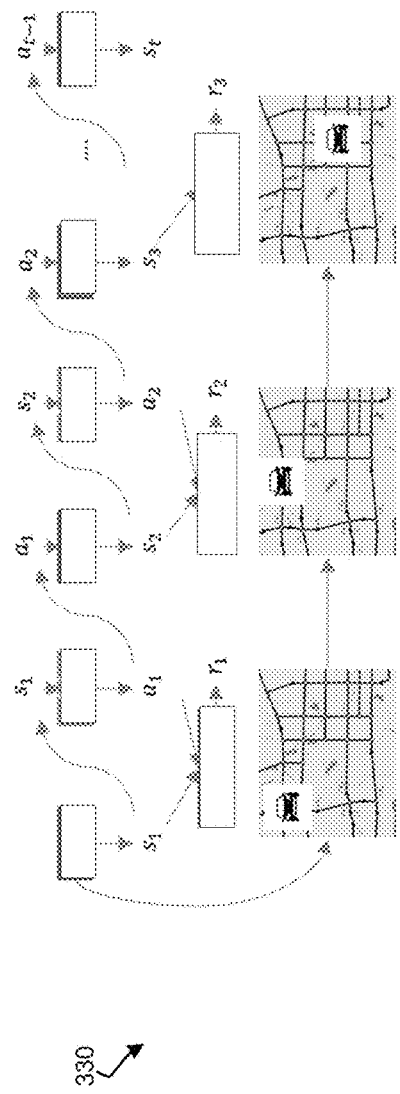

In another example, as shown in FIG. 4, a reinforcement learning method 330 is used to select the access points. Where [B, R, L, C, N, O, W] as defined above are the states S, and $P_j^i$ is the probability of selecting the $i^{th}$ access point at the $j^{th}$ segment, a reward r is computed in terms of the total cost k and the number of transmitted bytes d as:

$$r(k, d) = \lambda_3 \cdot \frac{d}{k},$$

where k is the cost for each selection, and d is the number of bytes transmitted at the selected AP. 231,234,237,238 are environmental components which are reflected as S1,S2,St states. 232,235 are actor components reflected as A1,A2, and 233,236,239 are reward components reflected as R1,R2,R3. The reinforcement learning method 330 maximizes the total rewards Rt by choosing a set of actions in the Markov decision process.

As can be appreciated, other methods can be performed by the access point selection module 204 in order to determine the set of access points as embodiments are not limited to the present examples.

In various embodiments, the access point selection module 204 computes an encounter duration for each of the selected access points and provides the encounter duration as part of the set of access point data 226. For example, the encounter duration can be estimated by accessing current and average speed metrics for a road segment or geohash location. In various embodiments, estimation can be enhanced using traffic signal timing plan information received, for example, via a cellular interface to the traffic signal timing plan provider, via a Wi-Fi access point to the Internet to the traffic signal timing plan provider or via reception of a local broadcast from smart infrastructure (e.g., C-V2X or DSRC).

With reference back to FIG. 2, in various embodiments, the channel switching module 206 receives as input the set of access point data 226, and vehicle location data 227 indicating the vehicle's current location. The channel switching module 206 predictively switches the scanning channel of the communication system 100 to a channel of the next access point relative to the vehicle location indicated by the set of access point data 226. For example, the channel switching module 206 generates switch command data 228 to switch the channel from the current channel to the channel associated with the next access point based on the current location of the vehicle 10 and a distance from the next access point (e.g., switch to Ch9 at one mile away from the next access point).

In various embodiments, the channel switching module 206 generates announcement data 230 to announce the channel change to other modules of the communication system 100 and/or to in-vehicle devices (e.g., cell phones, tablets, smart watches, etc.) that the channel will be switched to the next channel. The announcement to the in-vehicle devices allows for the in-vehicle devices to have a smooth transition and keep the connection with the vehicle when vehicle transits to a different channel to connect access points. It also reduces the channel searching time to maximize Wi-Fi transmission opportunities.

In various embodiments, the packet transmission module 208 receives as input the channel announcement data 230, and the set of access point data 226. The packet transmission module 208 selectively transmits packets of the file data 210 from the file datastore 212 as packet data 232 The packet transmission module 208 selectively transmits the packet data 232 by determining a number of packets of the files to upload to each connected access point 50 along the route.

In various embodiments, the packet transmission module 208 determines the packets to transmit for each access point 50 based on access point performance such as bandwidth and a connection duration indicated by the set of access point data 226, and file transfer requirements such as a priority and a deadline for uploading each file indicated by the file data 210. In various embodiments, the packet transmission module 208 optimizes the total size of packets x during transmission at the jth access point based on a probability distribution:

$P(B_j \cdot h_j - x > e) \geq \eta$.

Where e is the error margin and $\eta$ is the minimal probability. Where the access point data indicates M selected access points along the route. Each access point $j \in [1, M]$ has a predicted arrival time $a_j$ and a departure time $b_j$ (based on traffic conditions), and the connection duration $h_j = b_j - a_j$, Each access point has a predicted bandwidth $B_j$.

Where the total size of packets x follows:

$x \geq \Sigma s_i \cdot \theta_i^j$.

Where the file data 212 indicates that there are N files that are due for transmission, $i \in [1, N]$. Each file has a size of $s_i$, an uploading priority $p_i$, an uploading deadline of $t_i$. Where $\theta_i^j = 1$ represent if the $i^{th}$ packet to be sent to $j^{th}$ access point and is solved based on a heuristic solution that ranks and fills:

For the $j^{th}$ access point, given that: $\beta_1 > 0$, $\beta_2 > 0$, $\beta_3 > 0$, $t_i > a_j$, $\theta_i^j$ follows:

$\theta_i^j = \max \Sigma_i [\beta_1 \cdot e^{-(s-x)} + \beta_2 \cdot p_i - \beta_3 \cdot (t_i - b_j)] \cdot \theta_i^j$ Where $\beta_1 \cdot e^{-(s_i - s)}$ represents the files that closer to the maximal packet size x. $\beta_2 \cdot p_i$ selects the files that have higher priority. $\beta_3 \cdot (t_i - b_j)$ selects files that are closer to the deadline. Where the distribution of $B_j \cdot h_j$ is predicted as:

$$J(\theta) = \frac{1}{2m} \left[ \sum_{i=1}^{m} (h_\theta(x^{(i)}) - y^{(i)})^2 + \lambda \sum_{j=1}^{m} \theta_j^2 \right].$$

Where access point total throughput $\phi$, access point bandwidth B, vehicle speed v, duration of transmission d, are assembled into a feature vector for vehicle i: $x_i = [\phi_i, B_i, v_i, d_i]$ and the capacity is represented by the total number of bytes transmitted $y_i$.

As can be appreciated, other methods can be performed by the packet transmission module 208 in order to determine the packet to transmit as embodiments are not limited to the present examples.

Figure 5:
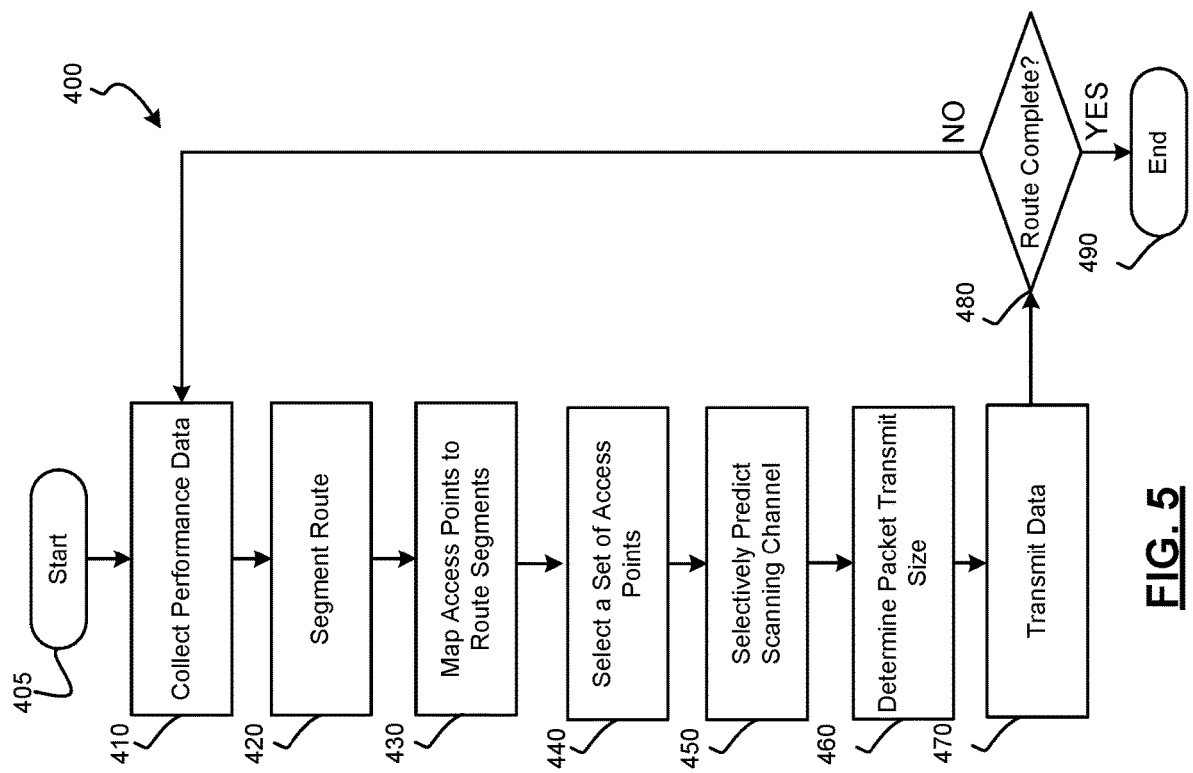
FIG. 5 is a flowchart illustrating a communication method for performing predictive Wi-Fi data offloading within the vehicle, in accordance with various embodiments.

Referring now to FIG. 5, and with continued reference to FIGS. 1-2, flowcharts illustrate a control method 400 that can be performed by the system 100 of FIGS. 1-2 in accordance with the present disclosure. As can be appreciated in light of the disclosure, the order of operation within the method is not limited to the sequential execution as illustrated in FIG. 5 but may be performed in one or more varying orders as applicable and in accordance with the present disclosure. In various embodiments, the method 400 can be scheduled to run based on one or more predetermined events, and/or can run continuously during operation of the autonomous vehicle 10.

In one example, the method 400 may begin at 405. The performance data and cost data is collected from various sources for various access points at 410. The route is segmented into route segments at 420. The Wi-Fi performance data for the various access points is evaluated at 430 and mapped to the route segments to produce the access point data. An optimization function is solved as discussed above to select a set of access points to connect to along the upcoming route at 440.

Thereafter, as the vehicle travels along the route, the scanning channel is predictively switched to the scanning channel of the next access point based on the current location of the vehicle and the set of selected access points at 450. A packet transmit number is determined for the next access point to maximize the use of Wi-Fi and ensure that data requirements such as priority and deadline are achieved at 460. The file data is transmitted based on the files to be transmitted and the packet transmit number at 470.

Thereafter, the method continues with collecting more performance data at 410 and optimizing the access point selections along the route until the route has been achieved at 480. Once the route is complete at 480, the method may end at 490.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of transmitting data from a vehicle using a Wi-Fi network, comprising:
   collecting, by a processor, performance data associated with a plurality of access points in the Wi-Fi network;
   segmenting, by a processor, a route into a plurality of route segments;
   mapping, by a processor, the plurality of access points to the plurality of route segments;
   selecting, by a processor, a set of access points from the plurality of access points based on the performance data, wherein the set of access points comprises a selected access point for each route segment of the plurality of route segments;
   predicting, by a processor, a scanning channel based on the set of access points and a current location of the vehicle;

determining a packet number based on the performance data, an encounter duration, and a bandwidth; and selectively transmitting, by a processor, packet data based on the set of access points, the scanning channel, the performance data, the packet number, a priority and a deadline.

2. The method of claim 1, wherein the performance data is collected from vehicles connected to the plurality of access points.

3. The method of claim 1, wherein the performance data is collected from the plurality of access points.

4. The method of claim 1, wherein the performance data comprises one or more of throughput, signal strength, a Wi-Fi channel, latency, capacity, and a price for each access point of the plurality of access points.

5. The method of claim 1, wherein the mapping the access points is based on geo-hashing.

6. The method of claim 1, wherein the mapping the access points is based on matching to a map of the vehicle or of a remote transportation system.

7. The method of claim 1, wherein the selecting the set of access points is based on a computed score computed from the performance data.

8. The method of claim 7, wherein the computed score is based on a cost to switch to the access point.

9. The method of claim 1, wherein the selecting the set of access points is based on a weighted graph.

10. The method of claim 1, wherein the selecting the set of access points is based on reinforcement learning.

11. The method of claim 1, wherein the predicting the scanning channel is based on a distance the current location of the vehicle is away from the access point.

12. A system for transmitting data from a vehicle using a Wi-Fi network, comprising:

a first non-transitory computer module configured to, by a processor, collect performance data associated with a plurality of access points in the Wi-Fi network;

a second non-transitory computer module configured to, by a processor, segment a route into a plurality of route segments, and map the plurality of access points to the plurality of route segments;

a third non-transitory computer module configured to, by a processor, select a set of access points from the plurality of access points based on the performance data, wherein the set of access points comprises a selected access point for each route segment of the plurality of route segments;

a fourth non-transitory computer module configured to, by a processor, predict a scanning channel based on the set of access points and a current location of the vehicle; and a fifth non-transitory computer module configured to, by a processor, determine a packet number based on the performance data, an encounter duration, and a bandwidth, and selectively transmit packet data based on the set of access points, the scanning channel, the performance data, the packet number, a priority and a deadline.

13. The system of claim 12, wherein the performance data is collected from vehicles connected to the plurality of access points.

14. The system of claim 12, wherein the performance data is collected from the plurality of access points.

15. The system of claim 12, wherein the performance data comprises one or more of throughput, signal strength, a Wi-Fi channel, latency, capacity, and a price for each access point of the plurality of access points.

16. The system of claim 12, wherein the second non-transitory computer module is configured to map the access points based on at least one of geo-hashing and matching to a map of the vehicle or of a remote transportation system.

17. The system of claim 12, wherein the third non-transitory computer module is configured to select the set of access points based on a computed score computed from the performance data, wherein the computed score is based on a cost to switch to the access point.

18. The system of claim 12, wherein the third non-transitory computer module is configured to select the set of access points based on at least one of a weighted graph and reinforcement learning.

* * * * *